United States Patent
Kodama (10) Patent No.: US 10,069,171 B2
(45) Date of Patent: Sep. 4, 2018

(54) METHOD FOR MANUFACTURING ALL-SOLID-STATE LITHIUM ION BATTERY

(71) Applicant: TOYOTA JIDOSHA KABUSHIKI KAISHA, Toyota-shi, Aichi-ken (JP)

(72) Inventor: Masashi Kodama, Hadano (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/837,090

(22) Filed: Dec. 11, 2017

(65) Prior Publication Data

US 2018/0205119 A1  Jul. 19, 2018

(30) Foreign Application Priority Data

Jan. 17, 2017 (JP) .................. 2017-006044

(51) Int. Cl.
| | |
|---|---|
| *H01M 10/04* | (2006.01) |
| *H01M 10/0585* | (2010.01) |
| *H01M 10/0525* | (2010.01) |
| *H01M 4/587* | (2010.01) |
| *H01M 4/133* | (2010.01) |
| *H01M 4/134* | (2010.01) |

(Continued)

(52) U.S. Cl.
CPC ....... *H01M 10/0585* (2013.01); *H01M 4/133* (2013.01); *H01M 4/134* (2013.01); *H01M 4/386* (2013.01); *H01M 4/587* (2013.01); *H01M 10/04* (2013.01); *H01M 10/0525* (2013.01); *H01M 10/0562* (2013.01)

(58) Field of Classification Search
CPC ......... H01M 10/0585; H01M 10/0525; H01M 10/04; H01M 4/587; H01M 4/133; H01M 4/134; H01M 4/386; H01M 10/0562; H01M 4/382; H01M 4/366; H01M 2/145; H01M 4/621; H01M 2/08; H01M 4/139; H01M 2300/0037; H01M 4/04; H01M 4/8668; H01M 6/40

See application file for complete search history.

(56) References Cited

U.S. PATENT DOCUMENTS

| | | | | |
|---|---|---|---|---|
| 2011/0256455 A1* | 10/2011 | Coowar | ................... | H01G 9/02 429/247 |
| 2015/0221974 A1* | 8/2015 | Upadhyaya | ....... | H01M 10/0565 429/94 |

FOREIGN PATENT DOCUMENTS

| | | |
|---|---|---|
| JP | 2002-313289 A | 10/2002 |
| JP | 2009-266740 A | 11/2009 |

* cited by examiner

*Primary Examiner* — Vishal I Patel
(74) *Attorney, Agent, or Firm* — Sughrue Mion, PLLC (57) ABSTRACT

Disclosed is a method for manufacturing an all-solid-state lithium ion battery in which a laminated battery is coated with a thermosetting resin, capable of preventing the thermosetting resin from cracking due to charge and discharge of the all-solid-state lithium ion battery after the battery is coated with the thermosetting resin, the method including a first step of laminating a cathode layer, a solid electrolyte layer and an anode layer to form a laminated battery having both end faces in a lamination direction and side faces, a second step of charging the laminated battery until the laminated battery has 100% to 112% of state of charge, a third step of coating at least the side faces of the laminated battery that is charged with a thermosetting resin in an uncured state, and a fourth step of heating to cure the thermosetting resin.

6 Claims, 6 Drawing Sheets

(51) Int. Cl.
*H01M 4/38* (2006.01)
*H01M 10/0562* (2010.01)

METHOD FOR MANUFACTURING ALL-SOLID-STATE LITHIUM ION BATTERY

FIELD

The present application discloses a method for manufacturing an all-solid-state lithium ion battery.

BACKGROUND

Patent Literature 1 discloses a problem of providing a method for manufacturing an all-solid-state battery reduced in the dispersion of restraint load and capable of exerting a stable and excellent performance for a long time. Patent Literature 1 also discloses, as a means for solving the problem, a method of curing a thermosetting resin or the like in an uncured state, with a battery cell of an all-solid-state battery immersed in the thermosetting resin or the like in an uncured state, while pressurizing the battery cell by isostatic pressing. According to this method, it is thought that a curable resin coats and seals the battery cell, and can pressurize the battery cell.

CITATION LIST

Patent Literature

Patent Literature 1: JP2009-266740A

SUMMARY

Technical Problem

The inventor of the present application faced a problem that: where an all-solid-state lithium ion battery is manufactured by such a method disclosed in Patent Literature 1, repeating charge and discharge of the all-solid-state lithium ion battery after its manufacture leads to resin cracking, especially due to expansion of the anode in charging. Cracks in the resin were generated especially at the side faces (faces along the lamination direction of a laminated battery) of the all-solid-state lithium ion battery. This problem was especially found in the case where a thermosetting resin of high hardness was used.

The present application discloses a method for manufacturing an all-solid-state lithium ion battery in which a thermosetting resin coats a laminated battery, capable of preventing the thermosetting resin from cracking even when the all-solid-state lithium ion battery is subjected to charge and discharge after coated with the thermosetting resin.

Solution to Problem

As a means for solving the above problem, the present application discloses a method for manufacturing an all-solid-state lithium ion battery comprising: a first step of laminating a cathode layer, a solid electrolyte layer, and an anode layer, to form a laminated battery having both end faces in a lamination direction and side faces; a second step of charging the laminated battery until the laminated battery has 100% to 112% of state of charge; a third step of coating at least the side faces of the laminated battery that is charged, with a thermosetting resin in an uncured state; and a fourth step of heating to cure the thermosetting resin.

"Cathode layer" is a layer that includes at least a cathode active material. The cathode layer may include a cathode current collector.

"Solid electrolyte layer" is a layer that includes at least a solid electrolyte. The solid electrolyte may optionally include a binder and the like.

"Anode layer" is a layer that includes at least an anode active material. The anode layer may include an anode current collector.

"Laminated battery" is a laminate of the above-mentioned cathode layer, solid electrolyte layer, and anode layer. In the laminated battery, at least one cathode layer, at least one solid electrolyte layer, and at least one anode layer only need to be laminated. That is, the laminated battery only needs to form at least one single battery.

"State of charge" is defined as follows: a charged state where a potential to be a predetermined upper limit is obtained (that is, a full-charged state) is defined as 100% of state of charge; and a charged state where a potential to be a predetermined lower limit is obtained (that is, an uncharged state) is defined as 0% of state of charge. For example: where the anode layer includes carbon as an anode active material, a state where the potential of the anode is 0.05 V may be defined as 100% of state of charge; and where the anode layer includes silicon as an anode active material, a state where the potential of the anode is 0.11 V may be defined as 100% of state of charge.

In the manufacturing method of the present disclosure, it is preferable that the solid electrolyte layer include a sulfide solid electrolyte, and in the fourth step, the heating be carried out at a temperature of 80° C. to 100° C.

In the manufacturing method of the present disclosure, it is preferable that the anode layer include carbon as an anode active material, and in the second step, the laminated battery be charged until its anode potential reaches 0.03 V to 0.05 V (vs. Li/Li+).

In the manufacturing method of the present disclosure, it is also preferable that the anode layer include silicon as an anode active material, and in the second step, the laminated battery be charged until its anode potential reaches 0.07 V to 0.11 V (vs. Li/Li+).

Advantageous Effects

In the manufacturing method of the present disclosure, an all-solid-state lithium ion battery is formed by coating a laminated battery that is charged until it has a predetermined state of charge (SOC), with a curable resin. This makes it possible to coat the surface of the laminated battery with the curable resin, with especially the anode among the layers of the laminated battery expanded. That is, even though discharge and charge of the all-solid-state battery are repeated afterward, the laminated battery keeps its volume the same or smaller than the volume right after manufacturing, and the anode does not excessively expand in size in comparison with its size right after manufacturing. Thus, it is possible to inhibit the curable resin from cracking due to expansion of the anode in charging.

DETAILED DESCRIPTION OF EMBODIMENTS

Figure 1:
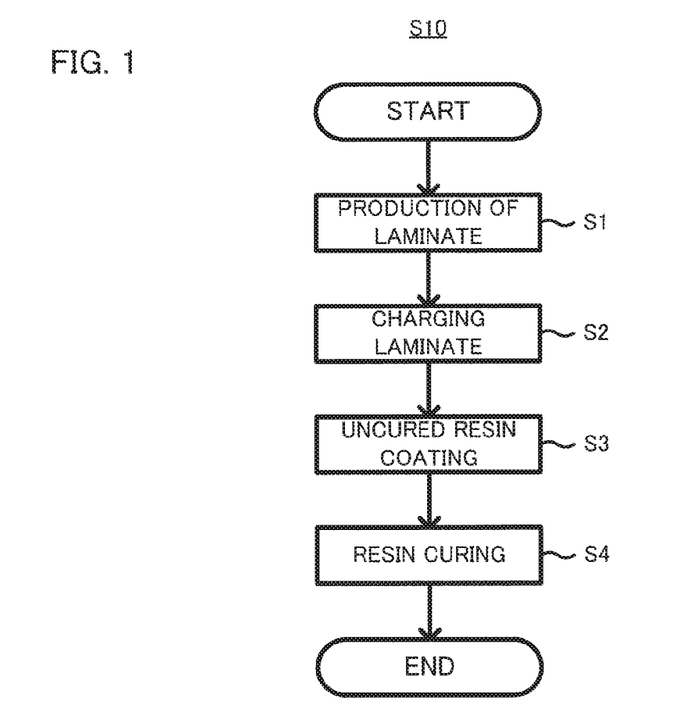
FIG. 1 is a flow chart to explain a manufacturing method S10 of an all-solid-state lithium ion battery.

FIG. 1 shows a flow of a manufacturing method (S10) of an all-solid-state lithium ion battery. As shown in FIG. 1, S10 includes a first step (S1) of laminating a cathode layer, a solid electrolyte layer, and an anode layer to form a laminated battery that has end faces in a lamination direction and side faces, a second step (S2) of charging the laminated battery until it has 100% to 112% of state of charge, a third step (S3) of coating at least the side faces of the laminated battery that is charged, with a thermosetting resin in an uncured state, and a fourth step (S4) of heating to cure the thermosetting resin.

1. First Step (S1)

In S1, the cathode layer, the solid electrolyte layer, and the anode layer are laminated to be the laminated battery that has both end faces in a lamination direction and side faces. In the laminated battery, at least one cathode layer, at least one solid electrolyte layer, and at least one anode layer only need to be laminated.

Figure 2A:
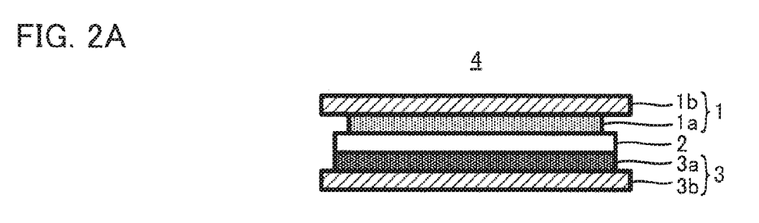
FIGS. 2A and 2B are schematic views to explain an example of a laminated battery obtained by a first step (S1)
Figure 2B:
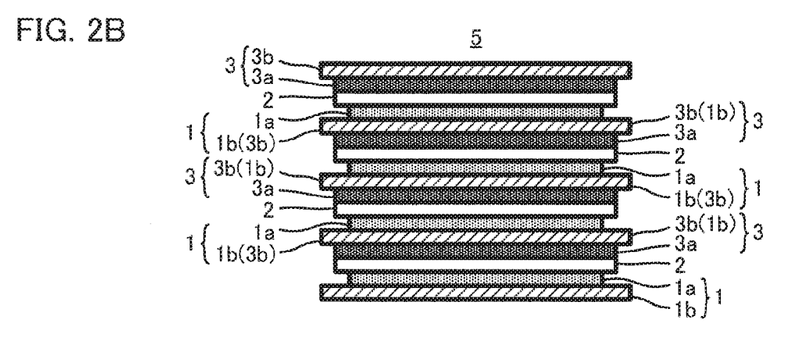

FIG. 2 schematically shows an example of the laminated battery obtained by S1. The laminated battery may be a laminated battery 4 in which one cathode layer 1, one solid electrolyte layer 2, and one anode layer 3 are laminated (single battery) as shown in FIG. 2A, and may be a laminated battery 5 in which the cathode layer 1, the solid electrolyte layer 2, and the anode layer 3 are repeatedly laminated as shown in FIG. 2B. Preferably, the cathode layer 1, the solid electrolyte 2, and the anode layer 3 are repeatedly laminated in the laminated battery. Where the cathode layer 1, the solid electrolyte layer 2 and the anode layer 3 are repeatedly laminated, the number of lamination of each layer may be 2 to 200 for example, and preferably 10 to 80. Where the area of the side faces of the laminated battery is large as in the laminated battery 5, the problem of resin cracking easily occurs. However, according to the manufacturing method of the present disclosure, it is possible to properly inhibit resin cracking even in such a laminated battery 5.

The cathode layer 1 includes at least a cathode active material. That is, the cathode layer 1 includes a cathode mixture layer 1a that contains at least a cathode active material. The cathode mixture layer 1a may optionally include a solid electrolyte, a binder, and a conductive material, in addition to the cathode active material. For the cathode active material, known active materials may be used. Among known active materials, two materials of different potentials where predetermined ions are absorbed and discharged (charge-discharge potentials) may be selected, and the material that shows the nobler potential may be used as the cathode active material, and the material that shows the baser potential may be used as an anode active material which is described below. In forming the all-solid-state lithium ion battery, lithium-containing complex oxides of layered rock-salt structure, lithium-containing complex oxides of olivine type structure, lithium-containing complex oxides of spinel type structure, and the like may be used as the cathode active material. In this case, the surface of the cathode active material may be coated with an oxide layer such as lithium niobate layer. For the solid electrolyte, inorganic solid electrolytes are preferable. This is because inorganic solid electrolytes have higher ion conductivities than organic polymer electrolytes. This is also because inorganic solid electrolytes are excelled in heat resistance compared to organic polymer electrolytes. Examples of inorganic solid electrolytes include oxide solid electrolytes such as $Li_3PO_4$ and sulfide solid electrolytes such as $Li_2S$—$P_2S_5$. In particular, sulfide solid electrolytes are preferable in view of further increasing ion conductivity and battery capacity, sulfide solid electrolytes that include $Li_2S$—$P_2S_5$ are more preferable, and sulfide solid electrolytes that include 50 mol % or more of $Li_2S$—$P_2S_5$ are especially preferable. As the conductive material, carbon materials such as acetylene black and Ketjen black, and metal materials such as nickel, aluminum, and stainless steel may be used. As the binder, various binders such as butadiene rubber (BR), acrylate butadiene rubber (ABR), and polyvinylidene fluoride (PVdF) may be used. The content of each component in the cathode mixture layer 1a may be the same as before. The cathode mixture layer 1a may be formed into a sheet for example. The thickness of the cathode mixture layer 1a is, for example, preferably 0.1 μm to 1 mm, and more preferably 1 μm to 100 μm.

The cathode layer 1 may include a cathode current collector 1b. As the cathode current collector 1b, any known cathode current collectors of all-solid-state lithium ion batteries may be used. For example, the cathode current collector may be formed of metal foil, metal mesh, and the like. In particular, metal foil is preferable. As the metal of the cathode current collector 1b, Cu, Ni, Al, Fe, Ti, and the like may be given. The area of the lamination face and the thickness of the cathode current collector 1b are not particularly limited.

The solid electrolyte layer 2 includes a solid electrolyte and optionally includes a binder. The solid electrolyte layer 2 preferably includes the above-mentioned inorganic solid electrolyte, and especially preferably includes a sulfide solid electrolyte. For the binder, similar binders used in the cathode mixture layer 1a may be adequately selected to be used. The content of each component in the solid electrolyte layer 2 may be the same as before. The solid electrolyte layer 2 may be formed into a sheet for example. The thickness of the solid electrolyte layer 2 is, for example, preferably 0.1 μm to 1 mm, and more preferably 1 μm to 100 μm.

The anode layer 3 includes at least an anode active material. That is, the anode layer 3 includes an anode mixture layer 3a that contains at least an anode active material. The anode mixture layer 3a may optionally include a solid electrolyte, a binder, and a conductive material, in addition to the anode active material. For the anode active material, known active materials may be used. Among known active materials, two materials of different potentials where predetermined ions are absorbed and released (charge-discharge potential) may be selected, and the material that shows the nobler potential may be used as the above-described cathode active material, and the material that shows the baser potential may be used as the anode active material. For example, where the all-solid-state lithium ion battery is formed, silicon, carbon, various oxides, lithium metal, lithium alloys, and the like may be selected to be used as the anode active material. In particular, silicon and carbon are preferable because they can increase battery capacity. For the solid electrolyte, the binder, and the conductive material, similar solid electrolytes, binders, and conductive materials used in the cathode mixture layer 1a may be adequately selected to be used. The content of each component in the anode mixture layer 3a may be the same as before. For example, the anode mixture layer 3a includes 50 mass % or more, preferably 80 mass % or more, and more preferably 99 mass % or more of the anode active material. The anode mixture layer 3a may be formed into a sheet for example. The thickness of the anode mixture layer 3a is, for example, preferably 5 μm to 1 mm, and more preferably 20 μm to 100 μm. It is noted that the thickness of the anode mixture layer 3a is preferably determined in such a manner that the capacity of the anode is larger than that of the cathode.

The anode layer 3 may include an anode current collector 3b. For the anode current collector 3b, any known anode current collectors of all-solid-state lithium ion batteries may be employed. For example, the anode current collector 3b may be formed of metal foil, metal mesh, and the like. In particular, metal foil is preferable. As the metal of the anode current collector 3b, Cu, Ni, Al, Fe, Ti, and the like may be given. The area of the lamination face and the thickness of the anode current collector 3b are not particularly limited.

Figure 3:
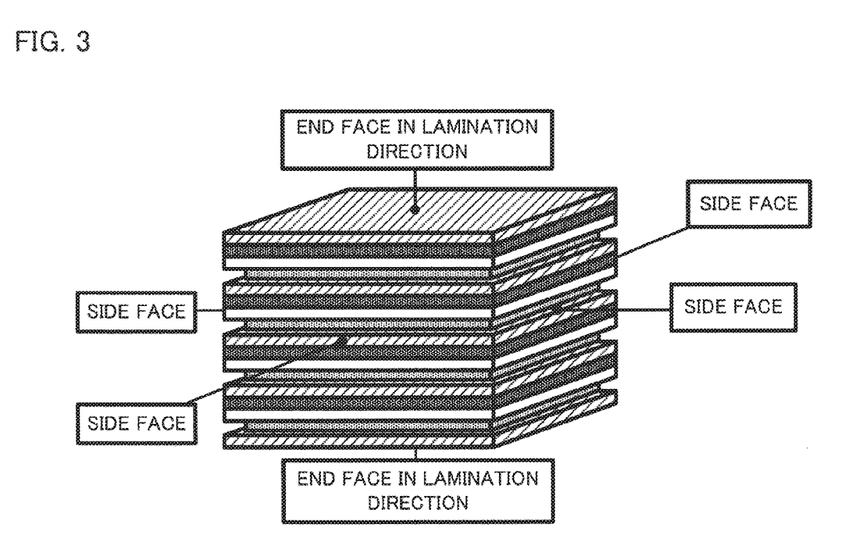
FIG. 3 is a schematic view to explain "both end faces in a lamination direction" and "side faces" of the laminated battery.

The laminated battery obtained in S1 is a laminate of the above-described cathode layer 1, solid electrolyte layer 2, and anode layer 3, and has both end faces in the lamination direction and side faces, as shown in FIG. 3 for example. Here, as shown in FIGS. 2B and 3, it is preferable that at least one of the layers project its part outward from other layers at the side faces of the laminated battery, to be an extended layer. This is because adhesion of the curable resin and the laminated battery increases in coating the side faces of the laminated battery with the curable resin. The layer to be the extended layer in the laminated battery is not particularly limited. It is preferable to make the current collector 1b or 3b extend outside the other layers to be the extended layer. It is also preferable to make the solid electrolyte layer 2 extend outside the other layers to be the extended layer. On the other hand, it is preferable that the cathode mixture layer 1a be recessed compared to the other layers.

As shown in FIGS. 2B and 3, a bipolar electrode layer may be formed of the cathode mixture layer 1a, the current collector 1b (3b), and the anode mixture layer 3a, in the laminated battery obtained by the first step (S1). The bipolar electrode layer can make the volume of the laminated battery decrease in the lamination direction, resulting in manufacture of an all-solid-state lithium ion battery of higher energy density. With the bipolar electrode layer, the battery elements in the laminated battery are serially connected to each other, which makes it possible to take out electricity from the current collectors that form the both end faces in the lamination direction of the laminated battery (outmost current collectors).

Where the current collector 1b (3b), the cathode mixture layer 1a and the anode mixture layer 3a do not form a bipolar electrode layer, single batteries in the laminated battery are to be connected in parallel. In other words, a plurality of cathode current collectors of the laminated battery need to be connected to one another, and a plurality of anode current collectors of the laminated battery need to be connected to one another, via leads or the like. In this case, forming end portions of the leads by the outmost current collectors enables taking out of electricity from the outmost current collectors. The laminated battery having such a structure sometimes has exposed leads or the like at the side faces of the laminated battery. In this case, for example in S3 described later, a curable resin may be applied at least over the side faces of the laminated battery, to coat the side faces and the exposed leads.

2. Second Step (S2)

Figure 4:
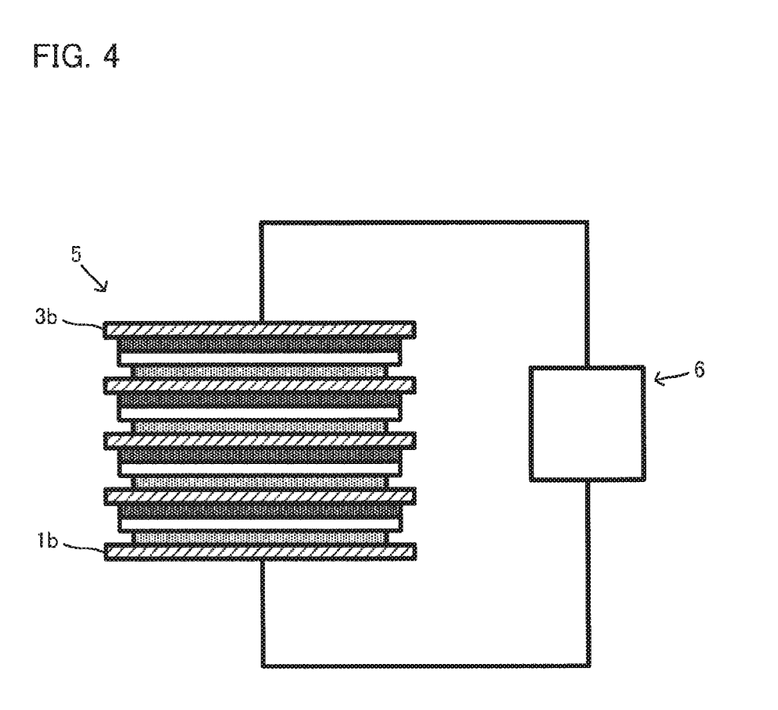
FIG. 4 is a schematic view to explain a second step (S2)

In S2, the laminated battery obtained in S1 is charged until the laminated battery has 100% to 112% of state of charge. Here, the "state of charge" is defined as follows: a charged state where a potential to be a predetermined upper limit is obtained (full-charged state) is defined as 100% of state of charge; and a charged state where a potential to be a predetermined lower limit is obtained (uncharged state) is defined as 0% of state of charge. For example, where the anode layer includes carbon as an anode active material, a state in which the potential of the anode is 0.05 V may be defined as 100% of state of charge. Where the anode layer includes silicon as an anode active material, a state in which the potential of the anode is 0.11 V may be defined as 100% of state of charge. In S2, as shown in FIG. 4 for example, it is possible to charge the laminated battery 5 by connecting the outmost current collectors 1b and 3b that form the both end faces in the lamination direction of the laminated battery, to a power source 6. As described, a feature of S2 is to charge the laminated battery until it has a predetermined state of charge. A full-charged or over-charged state of the laminated battery leads to expansion of the anode. In S3 and S4 described later, coating the laminated battery with a thermosetting resin with the anode expanded like this makes it possible to inhibit resin cracking due to the above-described anode expansion. That is, if the state of charge of the laminated battery is too small in S2, repeating charge and discharge of the battery after manufacturing (e.g., when the battery is used) may cause the electrodes to expand in size in comparison with its size right after manufacturing, and may cause the above-described resin cracking. On the other hand, if the state of charge of the laminated battery is too large in S2, the cathode that released too much lithium suddenly reduces its volume, and the anode easily deposits lithium, and lithium metal reaches the cathode along communicating pores in the solid electrolyte layer, to occur a minute short circuit. With the minute short circuit, the cathode expands and the anode shrinks gradually while the resin is applied and cured by heat, and may cause resin cracking while the resin is cured by heat. Thus, too large state of charge also may lead to the above-described resin cracking.

In S2, by having 100% to 112% of state of charge, it is possible to inhibit resin cracking resulting from the above-described anode expansion, regardless of types of the active material and the electrolyte of the laminated battery. The electrode potential that can realize such a state of charge varies with the type of the anode active material.

For example, where carbon is included as the anode active material in the anode layer, the laminated battery is preferably charged until the anode potential reaches 0.03 V to 0.05 V (vs. Li/Li+) in S2. This makes it possible to set the state of charge of the laminated battery within the range of 100% to 112%. When the anode potential is below 0.03 V, which is too close to 0 V, the battery may become difficult to handle.

Where silicon is included as the anode active material in the anode layer, the laminated battery is preferably charged until the anode potential reaches 0.07 V to 0.11 V (vs. Li/Li+) in S2. This makes it possible to set the state of charge of the laminated battery within the range of 100% to 112%.

3. Third Step (S3)

Figure 5A:
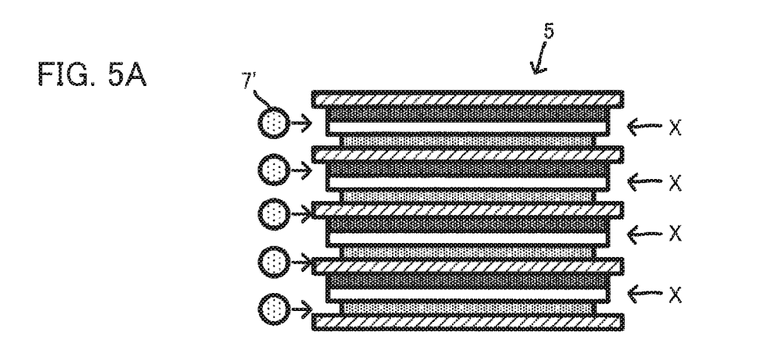
FIGS. 5A to 5C are schematic views to explain a third step (S3)
Figure 5B:
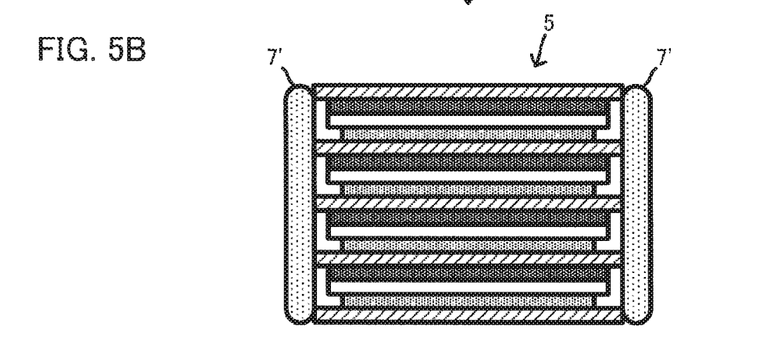

In S3, at least the side faces of the laminated battery that is charged are coated with a thermosetting resin in an uncured state. For example, as shown in FIG. 5, by applying a thermosetting resin 7' in an uncured state to at least the side faces of the laminated battery 5 (FIG. 5A), the side faces of the laminated battery 5 is naturally coated with the thermosetting resin 7' (FIG. 5B). In such a way, the thermosetting resin functions as a sealing material at least at the side faces of the laminated battery, and can inhibit invasion of the inside of the laminated battery by water and the like.

A method for coating at least the side faces of the laminated battery that is charged with a thermosetting resin in an uncured state in S3 is not particularly limited. The method may be immersing the laminated battery in an uncured thermosetting resin, and may be applying an uncured thermosetting resin onto the side faces of the laminated battery by a coating method of spray and the like. The supply amount (coating thickness) of the thermosetting resin in an uncured state in S3 is not particularly limited, and may be adequately adjusted depending on aimed performances (energy density, sealing property, etc.). For example, the thickness of the resin layer at the surface of the laminated battery is preferably 10 μm to 10 mm.

Figure 5C:
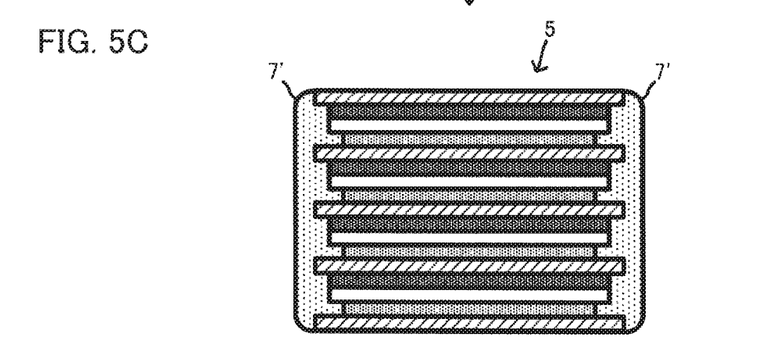

The thermosetting resin used in S3 is low in viscosity in an uncured state, compared to other resins such as thermoplastic resin. Thus, for example when the laminated battery has unevenness (gaps) at the side faces like the laminated battery 5 in FIG. 5, the thermosetting resin in an uncured state can reach deep portions of the unevenness (gaps) (FIG. 5C). This makes it possible to tightly and properly seal the side faces of the laminated battery.

The following is the reason for employing a thermosetting resin as a coating resin in the manufacturing method S10 of the present disclosure. Applying restraint pressure to the all-solid-state battery causes the contacting interfaces to increase and the interface resistances to decrease in and between each layer. Here, if a soft resin like a thermoplastic resin is used for applying restraint pressure to the all-solid-state battery, the resin deforms to ease the pressure, and the pressure might not be applied uniformly to the all-solid-state battery. In contrast to this, using a hard resin like a thermosetting resin can apply uniform pressure to the all-solid-state lithium ion battery via the hard resin. In addition, batteries produce heat by itself due to charge and discharge. Thus, using a thermoplastic resin further creates creeps, which results in ease of the pressure to decrease the restraint pressure.

Generally, thermosetting resins have high hardness and are easy to crack after cured, compared to other resins such as thermoplastic resin. Thus, resin cracking resulting from expansion of electrodes as described above easily occurs with thermosetting resins. In this point, in the manufacturing method S10 of the present disclosure, the laminated battery is coated with a thermosetting resin after the battery is charged (after the battery is expanded). Thus, cracking of the thermosetting resin can be inhibited even though discharge and charge are repeated afterward.

The type of the thermosetting resin is not particularly limited. For example, epoxy, phenol, melamine, urea, diallyl, polyester, and the like may be used. Among them, resins of low curing temperature (heating temperature) in S4 which is described below are preferable, and epoxy resins are preferable.

4. Fourth Step (S4)

Figure 6A:
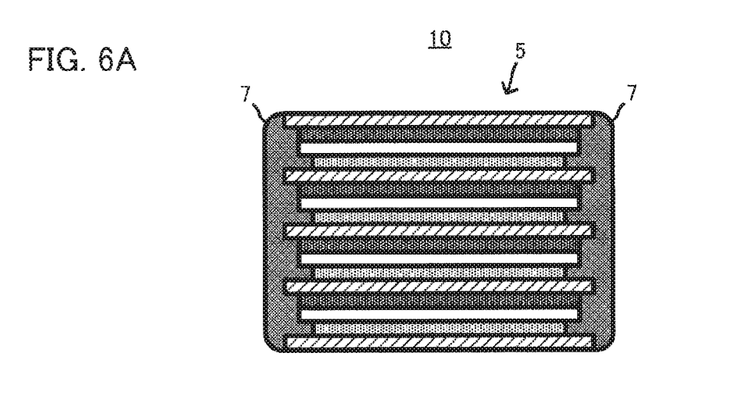
FIGS. 6A and 6B are schematic views to explain an embodiment of the all-solid-state lithium ion battery obtained through a fourth step (S4).
Figure 6B:
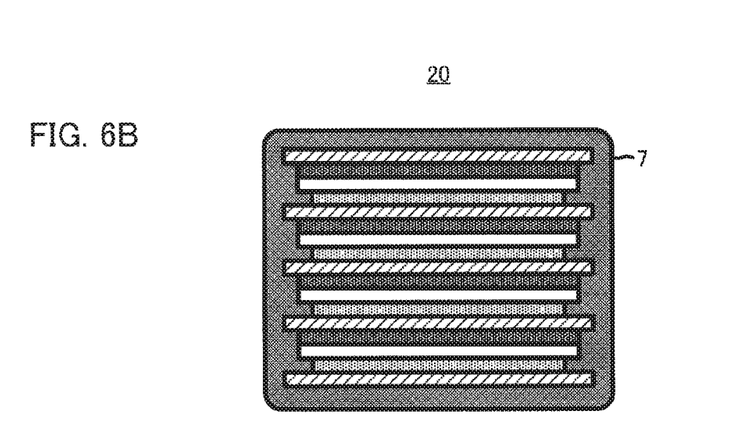

In S4, the thermosetting resin in an uncured state coating at least the side faces of the laminated battery in S3 is heated to cure. Any known means can be employed for the heating in S4. By going through S4, it is possible to manufacture an all-solid-state lithium ion battery 10 in which the side faces of the laminated battery 5 are coated with a thermosetting resin 7, as shown in FIG. 6A. Or, where the whole surface of the laminated battery is coated with the thermosetting resin in an uncured state in S3, it is possible to manufacture an all-solid-state lithium ion battery 20 in which the whole surface of the laminated battery 5 is coated with the thermosetting resin 7 (that is, the laminated battery 5 is buried in the thermosetting resin 7), as shown in FIG. 6B.

The heating temperature in S4 only needs to be a temperature at which the uncured thermosetting resin can be cured, and may be adequately set depending on the type of the thermosetting resin. It is noted that the heating temperature is preferably as low as possible. This is to avoid deterioration of the battery materials due to heating. For example, where the solid electrolyte layer includes a sulfide solid electrolyte, it is preferable to carry out the heating in S4 at a temperature of 80° C. to 100° C. This can avoid deterioration of the sulfide solid electrolyte and an all-solid-state lithium ion battery of higher battery capacity can be manufactured.

5. Optional Step

After the all-solid-state lithium ion battery is manufactured in S4, the surface of the cured resin may be coated with diamond-like carbon (DLC). Coating of the resin surface with diamond-like carbon may be provided by a known method (for example, Patent Literature 2002-313289A or the like). This reduces water permeability of the resin, and the all-solid-state lithium ion battery can be sealed more properly. It is noted that the presence or absence of DLC does not contribute to the inhibition of resin cracking. Thus, the coating with DLS is not necessary in view of solving the above problem.

As described, the all-solid-state lithium ion battery by the manufacturing method S10 that has S1 to S4 can inhibit cracking of the cured resin due to expansion of electrodes even though discharge and charge are repeated afterward, because the laminated battery keeps its volume the same or less than the volume right after manufacturing, and the electrodes (especially anode) do not excessively expand in size in comparison with its size right after manufacturing.

6. Supplementary Note

As a method for sealing a laminated battery, there is a way of wrapping a laminated battery with laminate film. Laminate film has a certain amount of flexibility, with which the problem of resin cracking described above is difficult to occur. However, sealing a laminated battery with laminate film cannot completely remove wrinkles and surplus (seal portion etc.) of the laminate film, resulting in decrease in volume energy density accordingly. In addition, where the lamination number of each kind of layers in the laminated battery is large as the laminated battery 5 shown in FIG. 2B, a problem arises that deep drawing has limitation in consideration of the manufacturing steps, and laminate sealing of whole laminated battery cannot be properly done. In contrast to this, the method of coating a laminated battery with an uncured thermosetting resin can coat for example only a portion to be coated in the laminated battery with a minimum amount of resin, resulting in increase of the volume energy density of the all-solid-state battery. In addition, it is possible to properly coat at least the side faces of the laminated battery with the resin, regardless of the size of the laminated battery, by changing the supply amount of the resin according to the number of lamination in the laminated battery. Further, charging the laminated battery before coating the battery with the resin can inhibit the problem of resin cracking, as in the manufacturing method of the present disclosure.

EXAMPLES

1. Example 1

1.1. Production of Laminated Battery

A layer consisting of lithium nickel cobalt manganese oxide, a $Li_2S$—$P_2S_5$ based sulfide solid electrolyte, a PVdF binder, and an aluminum foil as a current collector was used as a cathode layer. A layer consisting of a $Li_2S$—$P_2S_5$ based sulfide solid electrolyte was used as a solid electrolyte layer. A layer consisting of carbon (graphite), a $Li_2S$—$P_2S_5$ based sulfide solid electrolyte, a PVdF binder, and a copper foil as a current collector was used as an anode layer. These layers were laminated to form a single battery (0.1 Ah). Twenty of the single batteries were laminated, whereby a laminated battery of 2 Ah was produced.

1.2. Charging Laminated Battery

The produced laminated battery was charged with a charge-discharge device (TOSCAT-3200, manufactured by TOYO SYSTEM CO., LTD.) until its anode potential reached 0.05 V (vs. Li/Li+), and thereafter the charging was paused (battery voltage 4.37 V).

1.3. Resin Coating of Laminated Battery

An epoxy resin (manufactured by NAMICS Corporation) was supplied over the side faces and both end faces in the lamination direction of the charged laminated battery, at room temperature and under dry-air environment, to bury the laminated battery in the epoxy resin. Supply of the resin was carried out by underfilling with a vacuum sealing device (manufactured by TORAY ENGINEERING Co., Ltd.), in such a manner that the coating thickness at the surface of the laminated battery was around 1000 μm.

1.4. Resin Curing

The laminated battery being buried was heated at 80° C. for 30 minutes with a heating apparatus (DP-300 manufactured by Yamato Scientific Co., Ltd.), to cure the epoxy resin, whereby an all-solid-state lithium ion battery according to Example 1 was obtained.

1.5. Evaluation of All-Solid-State Lithium Ion Battery

The obtained all-solid-state lithium ion battery was discharged with the charge-discharge device until its battery voltage reached 3 V, and thereafter subjected to a charge-discharge test, whereby the presence of resin cracking and the discharge capacity were checked.

2. Example 2

2.1. Production of Laminated Battery

A cathode layer consisting of lithium nickel cobalt manganese oxide, a solid electrolyte layer consisting of a $Li_2S$— $P_2S_5$ based sulfide solid electrolyte, and an anode layer consisting of silicon were used to form a single battery (0.1 Ah). Twenty of the single batteries were laminated, whereby a laminated battery of 2 Ah was produced.

2.2. Charging Laminated Battery

The produced laminated battery was charged with a charge-discharge device (TOSCAT-3200 manufactured by TOYO SYSTEM Co., Ltd.) until its anode potential reached 0.07 V (vs. Li/Li+), and thereafter the charging was paused (battery voltage 4.35 V).

2.3. Resin Coating of Laminated Battery and Resin Curing

Coating the charged laminated battery with resin and resin curing were carried out in the same way as in Example 1, whereby an all-solid-state lithium ion battery according to Example 2 was obtained.

2.4. Evaluation of All-Solid-State Lithium Ion Battery

The obtained all-solid-state lithium ion battery was discharged with the charge-discharge device until its battery voltage reached 2.5 V, and thereafter subjected to a charge discharge test, whereby the presence of resin cracking and the discharge capacity were checked.

3. Example 3

An all-solid-state lithium ion battery according to Example 3 was obtained in the same way of producing a laminated battery, coating the laminated battery with resin, and resin curing as in Example 1, except that the laminated battery was charged until its anode potential reached 0.03 V (vs. Li/Li+) and thereafter the charging was paused (battery voltage 4.45 V). The obtained all-solid-state lithium ion battery was discharged until its battery voltage reached 3 V, and thereafter subjected to a charge-discharge test, whereby the presence of resin cracking and the discharge capacity were checked.

4. Example 4

An all-solid-state lithium ion battery according to Example 4 was obtained in the same way of producing a laminated battery, coating the laminated battery with resin, and resin curing as in Example 2, except that the laminated battery was charged until its anode potential reached 0.11 V (vs. Li/Li+) and thereafter the charging was paused (battery voltage 4.16 V). The obtained all-solid-state lithium ion battery was discharged until its battery voltage reached 2.5 V, and thereafter subjected to a charge-discharge test, whereby the presence of resin cracking and the discharge capacity were checked.

5. Example 5

An all-solid-state lithium ion battery according to Example 5 was obtained in the same way of production, charge, resin coating of a laminated battery and resin curing as in Example 1, except that an epoxy resin (manufactured by Dexerials) that is different from the resin used in Example 1 was used, and the heating temperature at the resin curing was 100° C. The obtained all-solid-state lithium ion battery was discharged until its battery voltage reached 3 V, and thereafter subjected to a charge-discharge test, whereby the presence of resin cracking and the discharge capacity were checked.

6. Example 6

6.1. Production and Charge of Laminated Battery

A laminated battery was produced and charged in the same way as in Example 1.

6.2. Resin Coating of Laminated Battery

A phenol resin (manufactured by Panasonic Electric Works Co., Ltd.) was supplied over the side faces and both end faces in the lamination direction of the charged laminated battery, at room temperature and under dry-air environment, to bury the laminated battery in the phenol resin. The method for supplying the resin was the same as in Example 1.

6.3. Resin Curing

The laminated battery being buried was heated at 150° C. for 30 minutes with the heating apparatus, to cure the phenol resin. Whereby, an all-solid-state lithium ion battery according to Example 6 was obtained.

6.4. Evaluation of All-Solid-State Lithium Ion Battery

The obtained all-solid-state lithium ion battery was discharged with the charge-discharge device until its battery voltage reached 3 V, and thereafter subjected to a charge-discharge test, whereby the presence of resin cracking and the discharge capacity were checked.

7. Example 7

7.1. Production and Charge of Laminated Battery

A laminated battery was produced and charged in the same way as in Example 2.

7.2. Resin Coating of Laminated Battery and Resin Curing

Resin coating and resin curing were carried out to the charged laminated battery in the same way as in Example 6, whereby an all-solid-state lithium ion battery according to Example 7 was obtained.

7.3. Evaluation of All-Solid-State Lithium Ion Battery

The obtained all-solid-state lithium ion battery was discharged with the charge-discharge device until its battery volume reached 2.5 V, and thereafter subjected to a charge-discharge test, whereby the presence of resin cracking and the discharge capacity were checked.

8. Comparative Example 1

An all-solid-state lithium ion battery according to Comparative Example 1 was obtained in the same way of producing a laminated battery, resin coating of the laminated battery, and resin curing, as in Example 1, except that the laminated battery was charged until its anode potential reached 0.65 V (vs. Li/Li+), and thereafter the charging was paused. The obtained all-solid-state lithium ion battery was discharged until its battery voltage reached 3 V, and thereafter subjected to a charge-discharge test, whereby the presence of resin cracking and the discharging capacity were checked. 9. Comparative Example 2

An all-solid-state lithium ion battery according to Comparative Example 2 was obtained in the same way of producing a laminated battery, resin coating of the laminated battery, and resin curing, as in Example 2, except that the laminated battery was charged until its anode potential reached 0.057 V (vs. Li/Li+), and thereafter the charging was paused. The obtained all-solid-state lithium ion battery was discharged until its battery voltage reached 2.5 V, and thereafter subjected to a charge-discharge test, whereby the presence of resin cracking and the discharge capacity were checked.

10. Comparative Example 3

An all-solid-state lithium ion battery according to Comparative Example 3 was obtained in the same way of producing a laminated battery, resin coating of the laminated battery, and resin curing, as in Example 2, except that the laminated battery was charged until its anode potential reached 0.41 V (vs. Li/Li+), and thereafter the charging was paused. The obtained all-solid-state lithium ion battery was charged until its battery voltage reached 2.5 V, and thereafter subjected to a charge-discharge test, whereby the presence of resin cracking and the discharge capacity were checked.

The following Table 1 shows the results of checking the presence of resin cracking and the discharge capacity of each all-solid-state lithium ion battery of Examples 1 to 7 and Comparative Examples 1 to 3.

TABLE 1

|  | Anode | Anode potential (V) | SOC (%) | Curing temperature (° C.) | Presence of resin cracking | Discharge capacity (Ah) |
|---|---|---|---|---|---|---|
| Example 1 | carbon | 0.05 | 100 | 80 | none | 1.8 |
| Example 2 | silicon | 0.07 | 112 | 80 | none | 1.6 |
| Example 3 | carbon | 0.03 | 107 | 80 | none | 2.0 |
| Example 4 | silicon | 0.11 | 100 | 80 | none | 1.6 |
| Example 5 | carbon | 0.05 | 100 | 100 | none | 1.7 |
| Example 6 | carbon | 0.05 | 100 | 150 | none | 0.6 |
| Example 7 | silicon | 0.07 | 112 | 150 | none | 0.5 |
| Comp. Example 1 | carbon | 0.65 | 5 | 80 | present | 0.5 |
| Comp. Example 2 | silicon | 0.057 | 220 | 80 | present | 0 |
| Comp. Example 3 | silicon | 0.41 | 5 | 80 | present | 0 |

As obvious from the results shown in Table 1, each of the all-solid-state lithium ion batteries according to Comparative Examples 1 to 3, which was charged to below 100% or over 112% of charging state, had cracks in resin when charge and discharge were carried out. In particular, the cracks were remarkably found at the side faces of the laminated battery. It is considered that the anode expanded and shrunk due to charge and discharge, and the resin could not follow the volume change of the laminated battery, resulting in the resin cracking. It is also considered the coating and curing the resin with the battery having a minute short circuit due to an over charge of over 200% of state of charge caused the battery to shrink by the short circuit while the resin was cured, resulting in the resin cracking. In contrast to this, each of the all-solid-state lithium ion batteries according to Examples 1 to 7, in which the laminated battery was charged until it had 100% to 112% of state of charge, did not have resin cracking even by charge and discharge. It is considered that the problem of resin cracking was able to be avoided because the resin coating was carried out with the laminated battery charged to a predetermined state of charge and the anode expanded, which secured a space in the resin which was able to accept the changes in volume of the laminated battery in charge and discharge.

In addition, as obvious from the results shown in Table 1, the all-solid-state lithium ion batteries according to Examples 1 to 5, in which the heating temperature for curing the resin was low, 80° C. to 100° C., were able to increase their battery capacities compared to the all-solid-state lithium ion batteries according to Examples 6 and 7, in which the heating temperature was 150° C. It is considered setting the heating temperature low was able to avoid deterioration of battery materials (especially deterioration of the sulfide solid electrolyte in the solid electrolyte layer), resulting in an increase of the battery capacity.

In the above Examples, no example was shown where the battery was charged such that its anode potential was less than 0.05 V (Li/Li+) (over 107% of SOC) when carbon was used in the anode. This is because such a battery was thought to be difficult to handle because the potential was nearly 0 V. It is noted that, considering the above-described mechanism, even when carbon was used in the anode, the problem of resin cracking can be inhibited where the battery is charged to SOC 112%.

INDUSTRIAL APPLICABILITY

The all-solid-state lithium ion battery manufactured by the manufacturing method of the present disclosure can be used, for example, as a large on-board power source for vehicles.

REFERENCE SIGNS LIST 1 cathode layer
1a cathode mixture layer
1b cathode current collector
2 solid electrolyte layer
3 anode layer
3a anode mixture layer
3b anode current collector
4, 5 laminated battery
6 power source
7' thermosetting resin in an uncured state
7 thermosetting resin after cured
10, 20 all-solid-state lithium ion battery

The invention claimed is:

1. A method for manufacturing an all-solid-state lithium ion battery comprising:
a first step of laminating a cathode layer, a solid electrolyte layer, and an anode layer, to form a laminated battery having both end faces in a lamination direction and side faces;
a second step of charging the laminated battery until the laminated battery has 100% to 112% of state of charge;
a third step of coating at least the side faces of the laminated battery that is charged, with a thermosetting resin in an uncured state; and
a fourth step of heating to cure the thermosetting resin.

2. The method according to claim 1, wherein
the solid electrolyte layer includes a sulfide solid electrolyte, and
in the fourth step, the heating is carried out at a temperature of 80° C. to 100° C.

3. The method according to claim 1, wherein
the anode layer includes carbon as an anode active material, and
in the second step, the laminated battery is charged until its anode potential reaches 0.03 V to 0.05 V (vs. Li/Li+).

4. The method according to claim 1, wherein
the anode layer includes silicon as an anode active material, and
in the second step, the laminated battery is charged until its anode potential reaches 0.07 V to 0.11 V (vs. Li/Li+).

5. The method according to claim 2, wherein
the anode layer includes carbon as an anode active material, and
in the second step, the laminated battery is charged until its anode potential reaches 0.03 V to 0.05 V (vs. Li/Li+).

6. The method according to claim 2, wherein
the anode layer includes silicon as an anode active material, and
in the second step, the laminated battery is charged until its anode potential reaches 0.07 V to 0.11 V (vs. Li/Li+).

* * * * *